US006674720B1

(12) United States Patent
Passint et al.

(10) Patent No.: US 6,674,720 B1
(45) Date of Patent: Jan. 6, 2004

(54) AGE-BASED NETWORK ARBITRATION SYSTEM AND METHOD

(75) Inventors: Randal S. Passint, Chippewa Falls, WI (US); Gregory M. Thorson, Altoona, WI (US); Timothy Stremcha, Eau Claire, WI (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/408,778

(22) Filed: Sep. 29, 1999

(51) Int. Cl.[7] ................................................ H04L 12/26

(52) U.S. Cl. ....................................... 370/235; 370/389

(58) Field of Search ................................ 370/229, 230, 370/235, 395.21, 395.4, 395.42, 389

(56) References Cited

U.S. PATENT DOCUMENTS

| | | | | |
|---|---|---|---|---|
| RE28,577 E | 10/1975 | Schmidt | ...................... | 179/15 |
| 4,330,858 A | 5/1982 | Choquet | ...................... | 370/111 |
| 4,630,259 A | 12/1986 | Larson et al. | ................. | 370/60 |
| 4,771,391 A | 9/1988 | Blasbalg | ..................... | 364/514 |
| 4,811,214 A | 3/1989 | Nosenchuck et al. | ....... | 364/200 |
| 4,868,818 A | 9/1989 | Madan et al. | ................. | 371/11 |
| 4,933,933 A | 6/1990 | Dally et al. | ................... | 370/60 |
| 4,974,143 A | 11/1990 | Yamada | ...................... | 364/200 |
| 4,980,822 A | 12/1990 | Brantley et al. | ............ | 364/200 |
| 4,987,537 A | 1/1991 | Kawata | ...................... | 364/200 |
| 5,008,882 A | 4/1991 | Peterson et al. | ............ | 370/943 |
| 5,031,211 A | 7/1991 | Nagai et al. | ................ | 379/221 |
| 5,036,459 A | 7/1991 | Den Haan et al. | .......... | 364/200 |
| 5,081,623 A | 1/1992 | Ainscow | .................... | 370/85.4 |
| 5,083,265 A | 1/1992 | Valiant | ....................... | 395/800 |
| 5,105,424 A | 4/1992 | Flaig et al. | ................. | 370/941 |

(List continued on next page.)

FOREIGN PATENT DOCUMENTS

| | | | |
|---|---|---|---|
| EP | 0353819 | 2/1990 | ............. G06F/9/46 |
| EP | 0475282 | 9/1990 | ............. G06F/9/46 |
| EP | 0473452 | 3/1992 | ............. G06F/9/46 |
| EP | 0479520 | 4/1992 | ........... G06F/15/16 |
| EP | 0501524 | 9/1992 | ........... G06F/15/16 |
| EP | 0570729 | 11/1993 | ............ F06F/15/16 |
| WO | 87/01750 | 3/1987 | ............. E04B/1/94 |
| WO | 88/08652 | 11/1988 | ............. H04J/3/26 |
| WO | 95/16236 | 6/1995 | ............. G06F/9/46 |
| WO | 96/10283 | 4/1996 | .......... H02H/3/087 |
| WO | 96/32681 | 10/1996 | ........... G06F/15/16 |
| WO | 96/37834 | 11/1996 | ............. G06F/9/46 |

OTHER PUBLICATIONS

"Deadlock–Free Routing Schemes on Multistage Interconnection Networks", *IBM Technical Disclosure Bulletin, 35*, 232–233, (Dec., 1992).

"IEEE Standard for Scalable Coherent Interface (SCI)", *IEEE Std 1596–1992, Table of Contents*, pp. vii–xvii, (Mar., 1992).

Adve, V.S., et al., "Performance Analysis of Mesh Interconnection Networks with Deterministic Routing", *Transactions on Parallel and Distributed Systems, 5(3)*, 225–246, (Mar. 1994).

(List continued on next page.)

*Primary Examiner*—Wellington Chin
*Assistant Examiner*—Brenda Pham
(74) *Attorney, Agent, or Firm*—Schwegman, Lundberg, Woessner & Kluth, P.A.

(57) ABSTRACT

In a multiprocessor system having a plurality of nodes connected to a network, wherein communication between the plurality of nodes is in the form of packets, a system and method of aging packets. A packet having an age value is built and transmitted through the network. The age value is increased at predetermined intervals, wherein increasing includes determining a current age of the packet and changing the interval as a function of the current age. A method of avoiding livelock and a method of preaging response packets is also described.

24 Claims, 13 Drawing Sheets

| AGE RATE SEL | AGE: 0–63 | AGE: 64–127 | AGE: 128–191 | AGE: 192–239 | MAX CPS |
|---|---|---|---|---|---|
| 0 | 0 | 0 | 1 | 3 | 637 |
| 1 | 0 | 1 | 3 | 5 | 2229 |
| 2 | 1 | 2 | 4 | 7 | 7552 |
| 3 | 1 | 3 | 6 | 9 | 29238 |
| 4 | 2 | 4 | 7 | 11 | 107628 |
| 5 | 2 | 5 | 9 | 13 | 427740 |
| 6 | 3 | 6 | 11 | 16 | 3.28E+06 |
| 7 | 3 | 8 | 14 | 22 | 2.02E+08 |

U.S. PATENT DOCUMENTS

| | | | | |
|---|---|---|---|---|
| 5,117,350 A | | 5/1992 | Parrish et al. | 395/425 |
| 5,134,690 A | | 7/1992 | Samatham | 395/200 |
| 5,157,692 A | | 10/1992 | Horie et al. | 375/38 |
| 5,161,156 A | | 11/1992 | Baum et al. | 371/7 |
| 5,170,482 A | | 12/1992 | Shu et al. | 395/800 |
| 5,175,733 A | | 12/1992 | Nugent | 370/94 |
| 5,195,100 A | | 3/1993 | Katz et al. | 371/66 |
| 5,197,130 A | | 3/1993 | Chen et al. | 395/325 |
| 5,201,044 A | | 4/1993 | Frey, Jr. et al. | 395/575 |
| 5,210,705 A | | 5/1993 | Chauvel et al. | 364/572 |
| 5,218,601 A | | 6/1993 | Chujo et al. | 370/16 |
| 5,218,676 A | | 6/1993 | Ben-ayed et al. | 395/200 |
| 5,233,618 A | | 8/1993 | Glider et al. | 371/68.1 |
| 5,239,545 A | | 8/1993 | Buchholz | 370/95.3 |
| 5,260,935 A | * | 11/1993 | Turner | 370/60 |
| 5,274,799 A | | 12/1993 | Brant et al. | 395/575 |
| 5,276,899 A | | 1/1994 | Neches | 395/800 |
| 5,280,474 A | | 1/1994 | Nickolls et al. | 370/60 |
| 5,297,137 A | | 3/1994 | Ofek et al. | 370/60 |
| 5,303,244 A | | 4/1994 | Watson | 371/10.1 |
| 5,313,628 A | | 5/1994 | Mendelsohn et al. | 395/575 |
| 5,313,645 A | | 5/1994 | Rolfe | 395/800 |
| 5,331,631 A | | 7/1994 | Teraslinna | 370/60 |
| 5,333,279 A | | 7/1994 | Dunning | 395/325 |
| 5,341,504 A | | 8/1994 | Mori et al. | 395/800 |
| 5,345,565 A | | 9/1994 | Jibbe et al. | 395/325 |
| 5,347,450 A | | 9/1994 | Nugent | 395/200 |
| 5,353,283 A | | 10/1994 | Tsuchiya | 370/60 |
| 5,361,334 A | | 11/1994 | Cawley | 395/200 |
| 5,365,228 A | | 11/1994 | Childs et al. | 340/825.8 |
| 5,367,692 A | | 11/1994 | Edelman | 395/800 |
| 5,383,191 A | | 1/1995 | Hobgood et al. | 371/112 |
| 5,390,164 A | | 2/1995 | Kremer | 370/16 |
| 5,394,528 A | | 2/1995 | Kobayashi et al. | 395/325 |
| 5,402,428 A | | 3/1995 | Kakuta et al. | 371/10.1 |
| 5,434,846 A | | 7/1995 | Themel et al. | 30/13 |
| 5,434,995 A | | 7/1995 | Oberlin et al. | 395/550 |
| 5,440,547 A | | 8/1995 | Easki et al. | 370/60 |
| 5,444,701 A | | 8/1995 | Cypher et al. | 370/60 |
| 5,452,444 A | | 9/1995 | Solomon et al. | 395/182.04 |
| 5,453,978 A | | 9/1995 | Sethu et al. | 370/60 |
| 5,475,858 A | | 12/1995 | Gupta et al. | 395/800 |
| 5,499,337 A | | 3/1996 | Gordon | 395/182.04 |
| 5,513,192 A | | 4/1996 | Janku et al. | 371/50.1 |
| 5,517,497 A | | 5/1996 | LeBoudec et al. | 370/60.1 |
| 5,519,844 A | | 5/1996 | Stallmo | 395/441 |
| 5,522,031 A | | 5/1996 | Ellis et al. | 395/182.04 |
| 5,530,948 A | | 6/1996 | Islam | 395/182.04 |
| 5,533,198 A | | 7/1996 | Thorson | 395/200.15 |
| 5,546,549 A | | 8/1996 | Barrett et al. | 395/309 |
| 5,546,596 A | | 8/1996 | Geist | 395/200.02 |
| 5,546,598 A | | 8/1996 | Yamaguchi et al. | 395/200.02 |
| 5,548,639 A | | 8/1996 | Ogura et al. | 379/221 |
| 5,550,589 A | | 8/1996 | Shiojiri et al. | 348/387 |
| 5,555,542 A | | 9/1996 | Ogura et al. | 370/94.1 |
| 5,583,990 A | | 12/1996 | Birrittella et al. | 395/200.01 |
| 5,590,124 A | | 12/1996 | Robins | 370/258 |
| 5,590,284 A | | 12/1996 | Crosetto | 395/200.05 |
| 5,592,610 A | | 1/1997 | Chittor | 395/182.02 |
| 5,596,742 A | | 1/1997 | Agarwal et al. | 395/500 |
| 5,613,071 A | | 3/1997 | Rankin et al. | 395/200.16 |
| 5,625,836 A | | 4/1997 | Barker et al. | 395/800 |
| 5,627,986 A | | 5/1997 | Frankland | 395/402 |
| 5,659,796 A | | 8/1997 | Thorson et al. | 395/200.71 |
| 5,669,008 A | | 9/1997 | Galles et al. | 395/800.12 |
| 5,682,479 A | | 10/1997 | Newhall et al. | 395/200.15 |
| 5,701,416 A | | 12/1997 | Thorson et al. | 395/800.11 |
| 5,721,819 A | | 2/1998 | Galles et al. | 395/200.15 |
| 5,721,921 A | | 2/1998 | Kessler et al. | 395/672 |
| 5,737,628 A | | 4/1998 | Birrittella et al. | 395/800.11 |
| 5,790,776 A | | 8/1998 | Sonnier et al. | 395/189.08 |
| 5,793,962 A | | 8/1998 | Badovinatz et al. | 395/200.31 |
| 5,793,976 A | * | 8/1998 | Chen et al. | 395/200.54 |
| 6,407,999 B1 | * | 6/2002 | Olkkonen et al. | 370/389 |

OTHER PUBLICATIONS

Bolding, K., "Non–Uniformities Introduced by Virtual Channel Deadlock Prevention", *Technical Report 92–07–07, Department of Computer Science and Engineering, FR–35 University of Washington*; Seattle, WA 98195, (Jul. 21, 1992).

Bolla, F.R., "A Neural Strategy for Optimal Multiplexing of Circuit and Packet–Switched Traffic", *IEEE*, 1324–1330, (1992).

Boppana, R., "A Framework for Designing Deadlock–free Wormhole Routing Algorithms", *IEEE Distributed Systems, 7* (*2*), 169–183, (Feb. 1996).

Boura, Y.M., et al., "Efficient Fully Adaptive Wormhole Routing in n–dimenstional Meshes", *IEEE*, 589–596, (1994).

Bundy, A., et al., "Turning Eureka Stepsinto Calculations in Automatic Program Synthesis", *UK IT,* (*IEEE Conf. Pub. 316*), pp. 221–226, (1991).

Carlile, B.R., "Algorithms and Design: The CRAY APP Shared–Memory System", *COMCON SPRING '93*, San Francisco, CA, 312–320, (Feb. 22, 1993).

Chien, A.A., et al., "Planar–Adaptive Routing: Low–Cost Adaptive Networks for Multiprocessors", *Pro. 19th International. Symposium on Computer Architecture*, 268–277, (May 1992).

Dally, W., "Performance Analysis of k–ary n–cube Interconnection Networks", *IEEE Transactions on Computers, 39*(*6*), 775–785, (Jun. 1990).

Dally, W., et al., "Deadlock–Free Message Routing in Multiprocessor Interconnection Networks", *IEEE Transactions on Computers, C–36*(*5*), 547–553, (May 1987).

Dally, W.J., "Virtual Channel Flow Control", *IEEE Pro. 17th International Symposium on Computer Architecture*, pp. 60–68, (May 1990).

Dally, W.J., et al., "Deadlock–Free Adaptive Routing in Multicomputer Networks Using Virtual Channels", *I.E.E.E. Transactions on Parallel and Distributed Systems, 4*(*4*), 466–475, (Apr. 1993).

Duato, J., "A New Theory of Deadlock–Free Adaptive Routing in Wormhole Networks", *I.E.E.E. Transactions on Parallel and Distributed Systems, 4*(*12*), 1320–1331, (Dec. 1993).

Farkouh, S.C., "Managing ATM–based Broadband Networks", *IEEE Communications, 31*(*5*), pp. 82–86, (1993).

Gallager, R., "Scale Factors for Distributed Routing Algorithm", *NTC '77 Conference Record, 2*, at 28:2–1 through 28:2–5, (1978).

Galles, M., "Spider: A High–Speed Network Interconnect", *IEEE Micro*, 34–39, (Jan./Feb. 1997).

Glass, C.J., et al., "The Turn Model for Adaptive Routing", *Pro. 19th Interanational Symposium on Computer architecture*, 278–287, (May 1992).

Gravano, L., et al., "Adaptive Deadlock– and Livelock–Free Routing with all Minimal Paths in Torus Networks", *IEEE Transactions on Parallel and Distributed Systems, 5*(*12*), 1233–1251, (Dec. 1994).

Gupta, R., et al., "High speed Synchronization of Processors Using Fuzzy Barriers", *International Journal of Parallel Programming 19* (*1*), pp. 53–73, (1990).

Gustavson, D.B., "The Scalable Coherent Interface and related Standards Projects", *IEEE Micro*, 10–22, (Feb., 1992).

Ishihata, H., et al., "Architecture of Highly Parallel AP1000 Computer", *Scripta Technica, Inc., Systems and Computers in Japan, 24*(*7*), pp. 69–76, (1993).

Jesshope, C.R., et al., "High Performance Communications in Processor Networks", *Proc. 16th International Symposium on Computer Architecture*, pp. 150–157, (May 1989).

Kirkpatrick, S., et al., "Optimization by Simulated Annealing", *SCIENCE*, May 13, 1993, 220(4599), 671–680, (May 1983).

Kumar, J.M., et al., "Extended Hypercube: A Hierarchical Interconnection Network of Hypercubes", *IEEE Transactions on Parallel and Distributed Sytems, 3* (*1*), 45–57, (Jan. 1992).

Laudon, J., et al., "The SGI Origin: A ccNUMA Highly Scalable Server", *ISCA*, 1–11, (1997).

Linder, D.H., et al., "An Adaptive And Fault Tolerant Wormhole Routing Strategy For K–ARY N–Cubes", *IEEE Transactions On Computers,40*(*1*), pp. 2–12, (1991).

Louri, A., et al., "Scalable optical hypercube–based interconnection network for massively parallel computing", *Applied Optics, 33* (*32*), 7588–7598, (Nov. 10, 1994).

Lui, Z., et al., "Grouping Virtual Channels for Deadlock–Free Adaptive Wormhole Routing", *PARLE '93 Parallel Parallel Architectures and Languages Europe, 5th International PARLE Conference*, Munich, Germany, 254–265, (Jun. 14–17, 1993).

Malluhi, Q.M., et al., "The Hierarchical Hypercube: A New Interconnection Topology for Massively Parallel Systems", *IEEE Transactions on Parallel and Distributed Systems, 5* (*1*), 17–30, (Jan. 1994).

Ni, L.M., et al., "A Survey of Wormhold Routing Techniques in Direct Networks", *IEEE Computer*, pp. 62–75, (1993).

Nuth, P., et al., "The J–Machine Network", *IEEE*, pp. 420–423, (1992).

O'Keefe, M.T., et al., "Static Barrier MIMD: Architecture and Performance Analysis", *Journal of Parallel and Distributed Computing No. 2*, pp. 126–132, (Mar. 25, 1995).

Patterson, D.A., et al., "A Case For Redundant Arrays Of Inexpensive Disks (RAID)", *University of California at Berkeley, Report No. UCB/CSD 87/391*, (Dec. 1987).

Prakash, S.A., "VLSI Implementation of a Wormhole Router using Virtual Channels", 1035–1039, (Aug. 22, 1994).

Schoinas, I., et al., "Fine–Grain Access Control for Distributed Shared Memory", *8398 ACM Sigplan Notices,* (*29*), New York, 297–306, (Nov. 1994).

Scott, S., et al., "Optimized Routing in the Cray T3D", 281–294, (May, 16, 1994).

Scott, S., "The SCX Channel: A New, Supercomputer–Class System Interconnect", *HOT Interconnects III*, Abstract, pp. 1–11, (Aug. 1–11, 1995).

Shumay, M., "Deadlock–Free Packet Networks", *Transputer Research and Applications 2, NATUG–2 Proceedings of the Second Conference of the North American Transputer Users Group*, 140–177, (Oct. 18–19, 1989).

Snyder, L., "Introduction to the Configurable, Highly Parallel Computer", *IEEE*, pp. 47–56, (Jan. 1982).

Talia, D., "Message–Routing Systems for Transputer–Based Multicomputer", *IEEE Micro, No. 3*, pp. 62–72, (Jun. 1993).

Wang, W., et al., "Trunk Congestion Control in Heterogeneous Circuit Switched Networks", *IEEE*, pp. 1156–1161, (Jul. 1992).

Wu, M., et al., "DO and FORALL: Temporal and Spacial Control Structures", *Proceedings, Third Workshop on Compilers for Parallel Computers, ACPC/TR*, pp. 258–269, (Jul. 1992).

Yang, C.S., et al., "Performance Evaluation of Multicast Wormhole Routing in 2D–Torus Multicomputers", *IEEE*, 173–178, (1992).

Yantchev, J., et al., "Adoptive, low latency, deadlock–free packet routing for networks of processors", *IEEE Proceedings, 136*, pp. 178–186, (May 1989).

* cited by examiner

| AGE RATE SEL | AGE: 0-63 | AGE: 64-127 | AGE: 128-191 | AGE: 192-239 | MAX CPS |
|---|---|---|---|---|---|
| 0 | 0 | 0 | 1 | 3 | 637 |
| 1 | 0 | 1 | 3 | 5 | 2229 |
| 2 | 1 | 2 | 4 | 7 | 7552 |
| 3 | 1 | 3 | 6 | 9 | 29238 |
| 4 | 2 | 4 | 7 | 11 | 107628 |
| 5 | 2 | 5 | 9 | 13 | 427740 |
| 6 | 3 | 6 | 11 | 16 | 3.28E+06 |
| 7 | 3 | 8 | 14 | 22 | 2.02E+08 |

| PRIORITY COUNTER | PRI 1[a] | PRI 2 | PRI 3 | PRI 4 | PRI 5 | PRI 6 | PRI 7 | PRI 8 |
|---|---|---|---|---|---|---|---|---|
| 0 | A[b] | B | C | D | E | F | G | H |
| 1 | B | A | D | C | F | E | H | G |
| 2 | C | B | A | B | G | H | E | F |
| 3 | D | B | B | A | H | G | F | E |
| 4 | E | B | G | H | A | B | C | D |
| 5 | F | B | H | G | B | A | D | C |
| 6 | G | B | E | F | C | D | A | B |
| 7 | H | B | F | E | D | C | B | A |

850

AGE-BASED NETWORK ARBITRATION SYSTEM AND METHOD

FIELD OF THE INVENTION

The present invention is related to networked computer systems, and more particularly to a nonlinear system and method of aging packets traveling through a packet switching network.

BACKGROUND INFORMATION

Communication latency is a common concern in packet switching networks. Steps are taken to reduce the average latency for network traffic. At the same time, care must be taken to limit the maximum latency faced by a packet in the network. Age-based arbitration has been used to limit the length of time that packets are in transit within the network. In one such approach, each header packet includes an age field. The contents of the age field are increased by a constant at each transfer point in the system (e.g., each node or each router).

In one such approach, such as was used in the Origin 2000 system manufactured by Silicon Graphics Inc. of Mountain View, Calif., a packet is assigned an age value of zero when it gets injected into the network. At predetermined intervals, the age field is incremented by a constant. (In the Origin 2000, each router had a register that could be programmed with a constant aging increment (e.g., 100 clocks or 1000 clocks).) Preferential routing is given to the oldest packets, so that they propagate to their destination.

Such an approach works well for most instances. Packets in the network get injected into the network with a value of zero and increment in a consistent fashion as they pass through the network. As the network size increases and as the number of packets active in the network increase, however, such an approach tends to result in large numbers of packets with similar ages. What is needed is a system and method of age-based arbitration which enables one to differentiate more easily between packets within the network.

SUMMARY OF THE INVENTION

According to one aspect of the present invention, in a multiprocessor system having a plurality of nodes connected to a network, wherein communication between the plurality of nodes is in the form of packets, a system and method of aging packets is described. A packet having an age value is built and transmitted through the network. The age value is increased at predetermined intervals, wherein increasing includes determining a current age of the packet and changing the interval as a function of the current age.

According to another aspect of the present invention, in a multiprocessor system having a plurality of nodes connected by a network, wherein communication between the plurality of nodes is in the form of packets routed through a router, wherein the router includes a plurality of ports, a system and method of routing packets through the plurality of ports. Packets are built. Each packet has an age value and the age value is set to a constant. A value is added to the age value at predetermined intervals, wherein adding a value to the aging value includes determining a current age of the packet and changing the interval as a function of the current age. Packets are queued in the router and are transmitted according to a priority which examines the age value of queued packets to determine an oldest packet and routes the oldest packet to a port.

According to yet another aspect of the present invention, in a multiprocessor system having a plurality of nodes connected by a network, wherein communication between the plurality of nodes is in the form of packets routed through a router, wherein the router includes a plurality of input ports and a plurality of output ports, a system and method of routing packets through the plurality of output ports is described. Packets are received at each of the plurality of input ports. Each packet has an age value and a value is added to the age value at predetermined intervals. One or more of the packets is transmitted to output ports, wherein transmitting includes examining the age value of packets to determine an oldest packet and routing the oldest packet through one of the plurality of output ports. In determining the packet to be transferred, if a packet arriving through a first input port and a packet arriving through a second input port have equivalent ages, the packet to be routed is determined as a function of the port through which it arrived, wherein determining the packet to be routed as a function of the port through which it arrived includes applying a rotating priority to each port.

According to yet another aspect of the present invention, in a multiprocessor system having a plurality of nodes connected by a network, wherein the plurality of nodes includes a first node and a second node, wherein each node includes a response age register and a plurality of ports connected to a network, wherein the response age register includes a response age value, wherein communication between the plurality of nodes is in the form of packets, wherein each packet has a source node field, a destination node field and an age field and wherein each age field contains an aging value, a system and method of routing packets through the plurality of ports is described. A request packet is generated at the first node, wherein generating includes loading a first node identifier representative of the first node in the source node field; loading a second node identifier representative of the second node in the destination node field and setting the aging value to a constant. A value is added to the aging value at predetermined intervals. The request packet is routed through a plurality of nodes to the second node, wherein routing includes resolving port conflicts through age-based arbitration. A response packet is generated, wherein generating includes loading a first node identifier representative of the first node in the destination node field; loading a second node identifier representative of the second node in the source node field and setting the aging value to the response age value stored in the second node's response age register.

BRIEF DESCRIPTION OF THE DRAWINGS

In the drawings, where the like number reflects similar function in each of the drawings.

FIG. 7 illustrates various nonlinear aging algorithms;

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
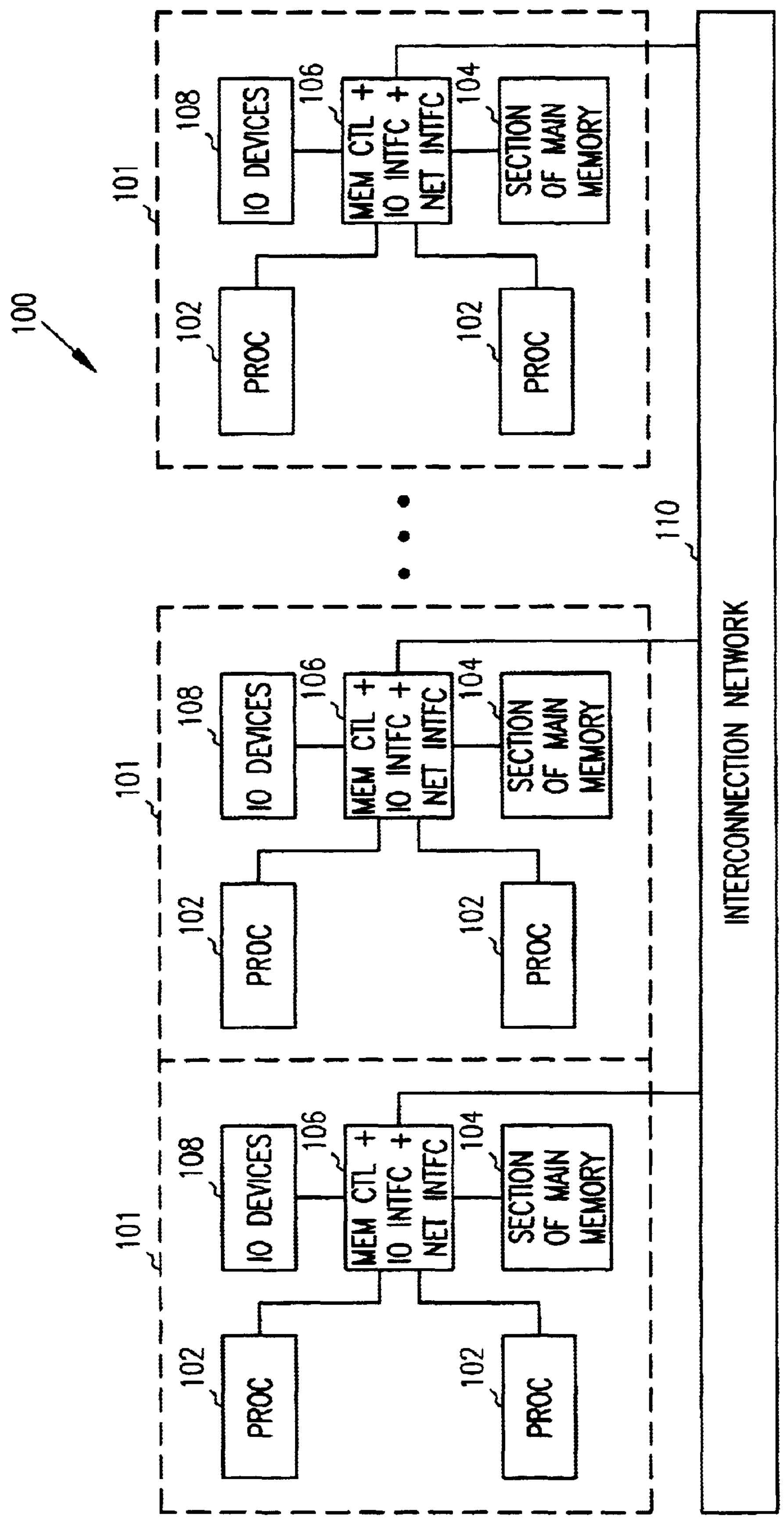
FIGS. 1–3 illustrate multiprocessor computer systems.

A multiprocessor computer system 100 is shown in FIG. 1. Multiprocessor computer system 100 includes a plurality of processing nodes 101 connected to an interconnection network 110. Each processing node 101 includes an interface circuit 106 connected to an I/O module 108, one or more processors 102 and a memory 104. Interface circuit 106 sends request and response packets onto interconnection network 110 and receives such packets from interconnection network 110. In the embodiment shown, memory for system 100 follows a distributed, shared memory model in which shared memory is distributed to each of the processing nodes 101.

Figure 2:
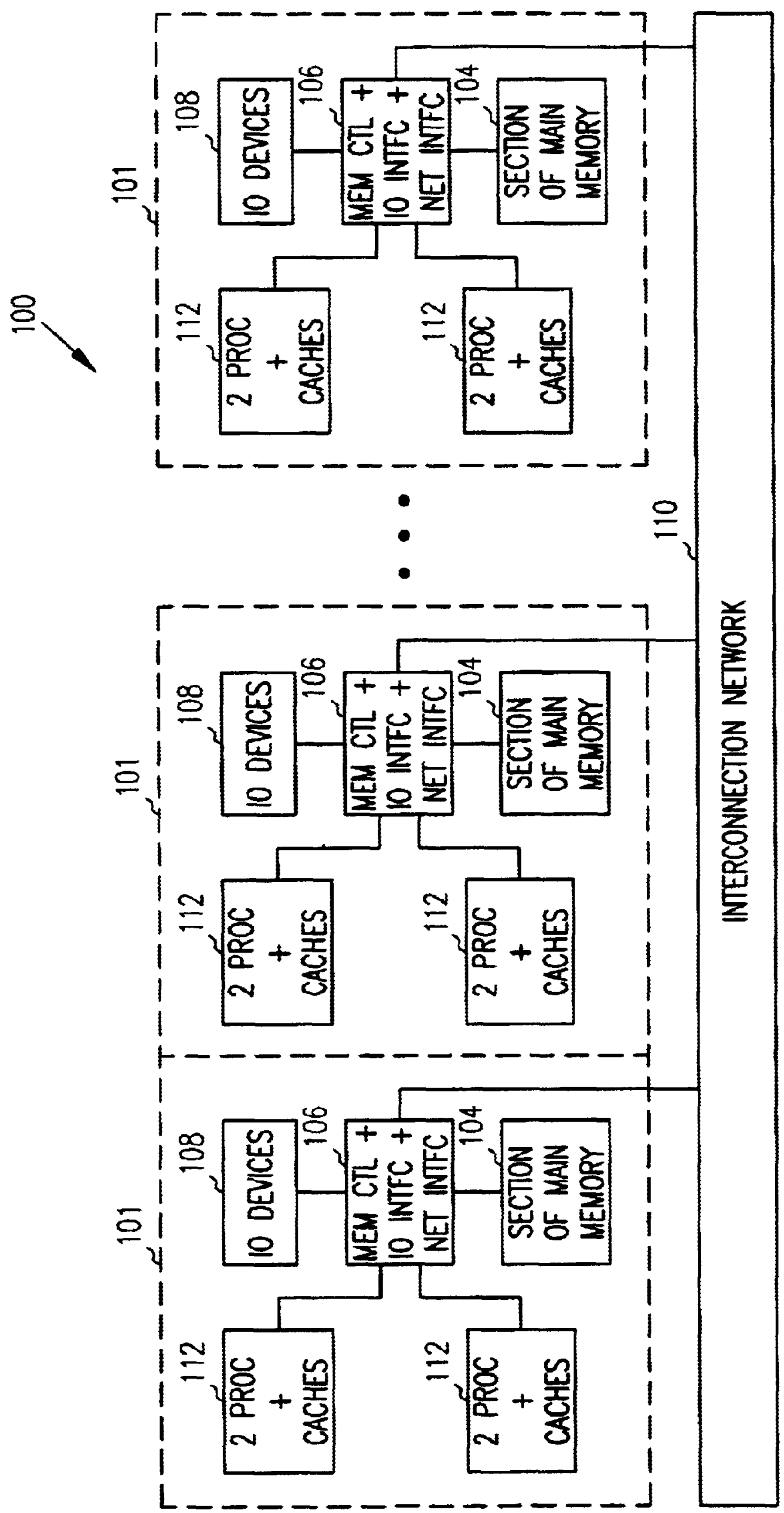

An alternate embodiment of a distributed shared memory multiprocessor computer system 100 is shown in FIG. 2. In the system shown in FIG. 2, each system 100 includes a plurality of processing nodes 101 connected to an interconnection network 110. Each processing node 101 includes an interface circuit 106 connected to an I/O module 108, one or more processor modules 112 and a memory 104. Interface circuit 106 sends request and response packets onto interconnection network 110 and receives such packets from interconnection network 110. In the embodiment shown, each processing node 101 include two or more processors and corresponding cache.

Figure 3:
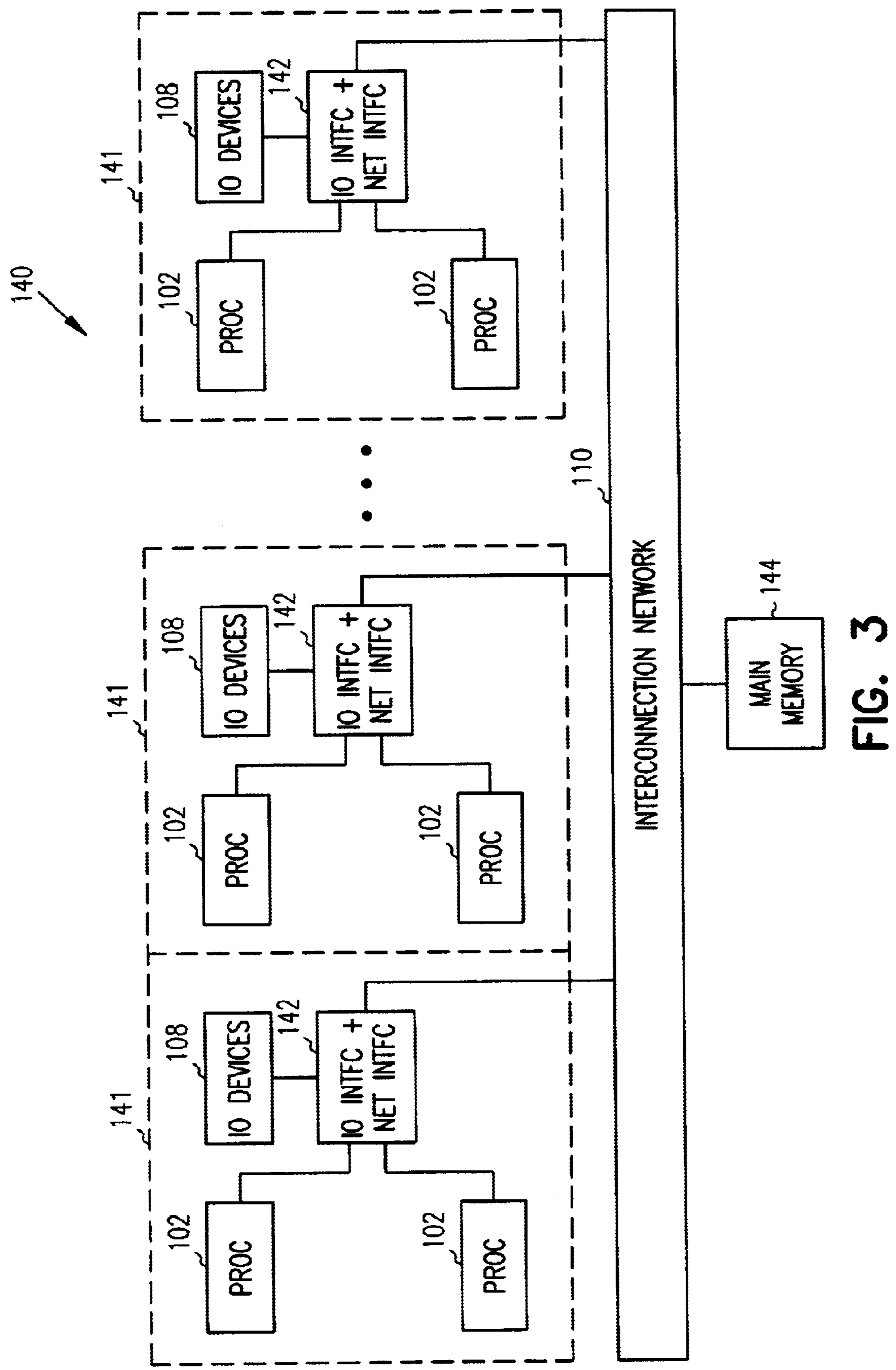

A different shared memory multiprocessor computer system 140 is shown in FIG. 3. In system 140, a plurality of processing nodes 141 are connected through an interconnection network 110 to shared memory 144. Each processing node 141 includes an interface circuit 106 connected to an I/O module 108 and to one or more processor modules 102. Interface circuit 106 sends request and response packets onto interconnection network 110 and receives such packets from interconnection network 110. In one embodiment, memory 144 is distributed as two or more nodes distributed across interconnection network 110.

Although the multiprocessor computer systems 100 and 140 illustrated in FIGS. 1–3 provide examples of interconnect topologies usable with the present, the present invention is in no way limited to this particular application environment. In fact, many alternative environments using alternative node and interface circuit configurations can be utilized. To a large extent, the topology according to the present invention, as implemented in scalable interconnect network 110, is independent of the complexity of the nodes, such as nodes 101 and 141, interconnected by that topology.

Figure 4:
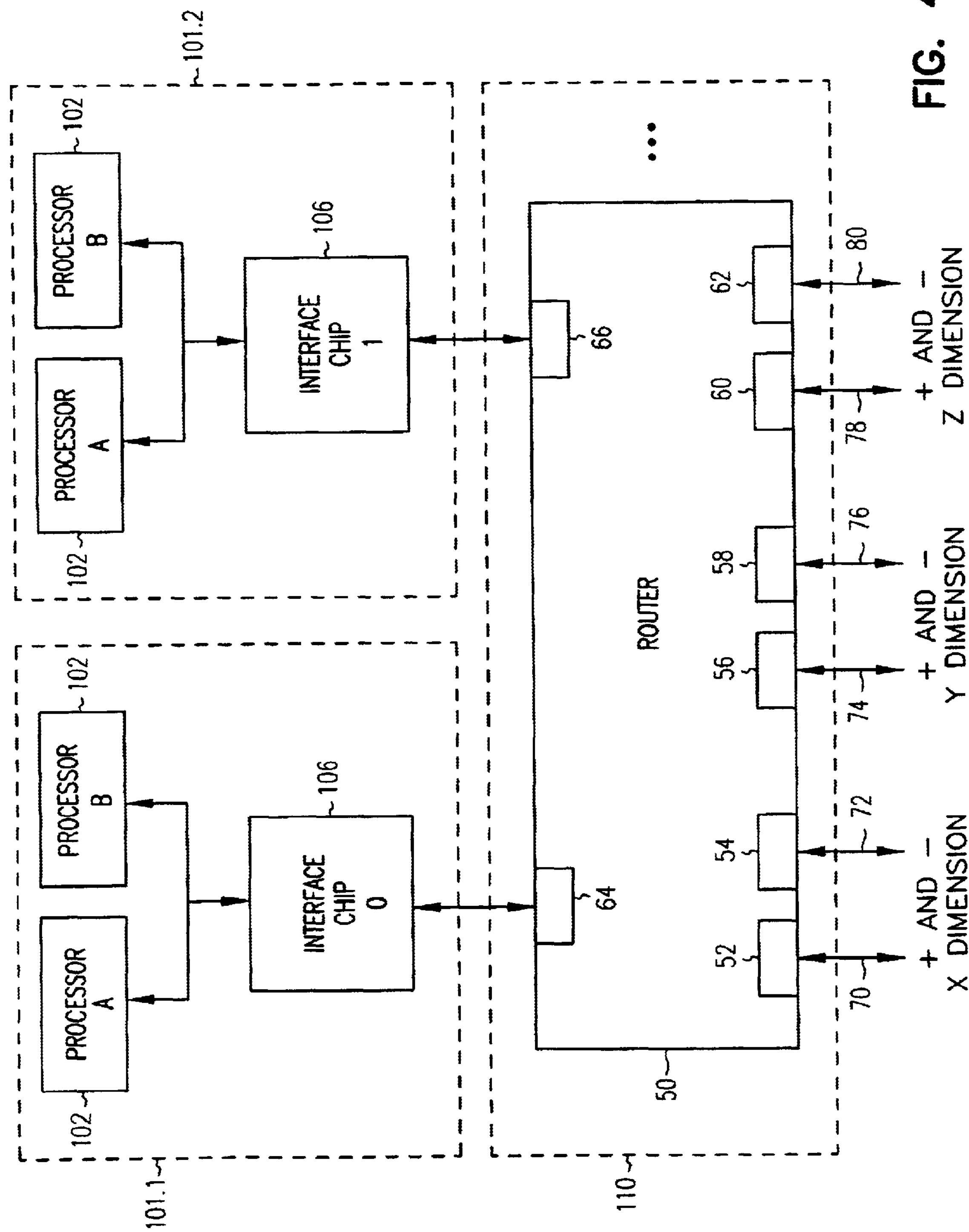
FIG. 4 illustrates an embodiment of an interface between processor nodes and a network.

FIG. 4 illustrates, in block diagram form, one embodiment of an interface between scalable interconnect network 110 and two nodes 101.1 and 101.2. In the embodiment shown in FIG. 4, scalable interconnect network 110 includes router chips, such as indicated at 50. Router chip 50 includes eight ports 52, 54, 56, 58, 60, 62, 64 and 66. Router ports 52 and 54 are respectively coupled to +X dimension physical communication link 70 and −X dimension physical communication link 72. Router ports 56 and 58 are respectively coupled to +Y dimension physical communication link 74 and −Y dimension physical communication link 76. Router ports 60 and 62 are respectively coupled to +Z dimension physical communication link 78 and −Z dimension physical communication link 80. Router port 64 communicates with node 101.1 and router port 66 communicates with node 101.2.

As indicated, router port 64 communicates with node 101.1 via interface circuit 106. Similarly, router port 66 communicates with node 101.2 via a second interface circuit 106. In nodes 101.1 and 101.2, each interface circuit 106 communicates with one or more processors 102.

Therefore, as illustrated in FIG. 4, this implementation of scalable interconnect network 110 transmits packets of information between the processor nodes in the + and − directions of three dimensions and routes packets to two nodes 101 which both include two processors. In other words, one router chip 50 communicates directly with four processors (30, 32, 30' and 32') and six physical communication links (70, 72, 74, 76, 78 and 80).

As will be better understood by the following discussion, the router chips according to the present invention, such as router chip 50, can easily scale and accommodate various topologies. In the embodiment illustrated in FIG. 4, network 110 is double bristled in that two nodes are connected to a single router 50.

In other alternative embodiments, additional ports are added to the router chip to permit additional bristling of nodes or the adding of additional dimensions. For example, if two additional ports were added to make a total of ten router ports, + and − directions of a fourth dimension could be added to the interconnect network. Alternatively, the two additional ports could be used to make a quadruple bristled network where four nodes are connected to a single router. In addition, other modifications can be made, such as implementing a single bristled network where only one node is connected to a single router. For example in eight-port router chip 50 having a single bristled implementation, there could be the + and − directions for the X, Y and Z dimension for connecting a torus, plus an additional single direction fourth dimension for connecting a mesh network. In addition, as illustrated in detail below, the eight router ports of router 50 can be used to create up to six-dimensional hypercube topologies.

In one embodiment, each port on router 50 has two router tables referred to as a local router table and a global router table. One approach to use of router tables in routing through an interconnect network 110 is described in U.S. patent application Ser. No. 08/971,587 filed Nov. 11, 1997 by Passint et al., the description of which is incorporated herein by reference. In one embodiment of multiprocessor computer system 100, 140 which is scalable to 2048 nodes, the local router table contains 128 locations and the global router table contains 16 locations. If a packet's source processor is in the same global partition as the destination processor, local tables will describe all of the routes required for the requests to reach their destination and for the response to return to the source. If the destination is in a different global partition, the global tables are used to describe how to get from one partition to the next. Since the router tables indicate which output port to take on the next router chip, router chips which are one hop from the destination global partition also use the local table.

Figure 5:
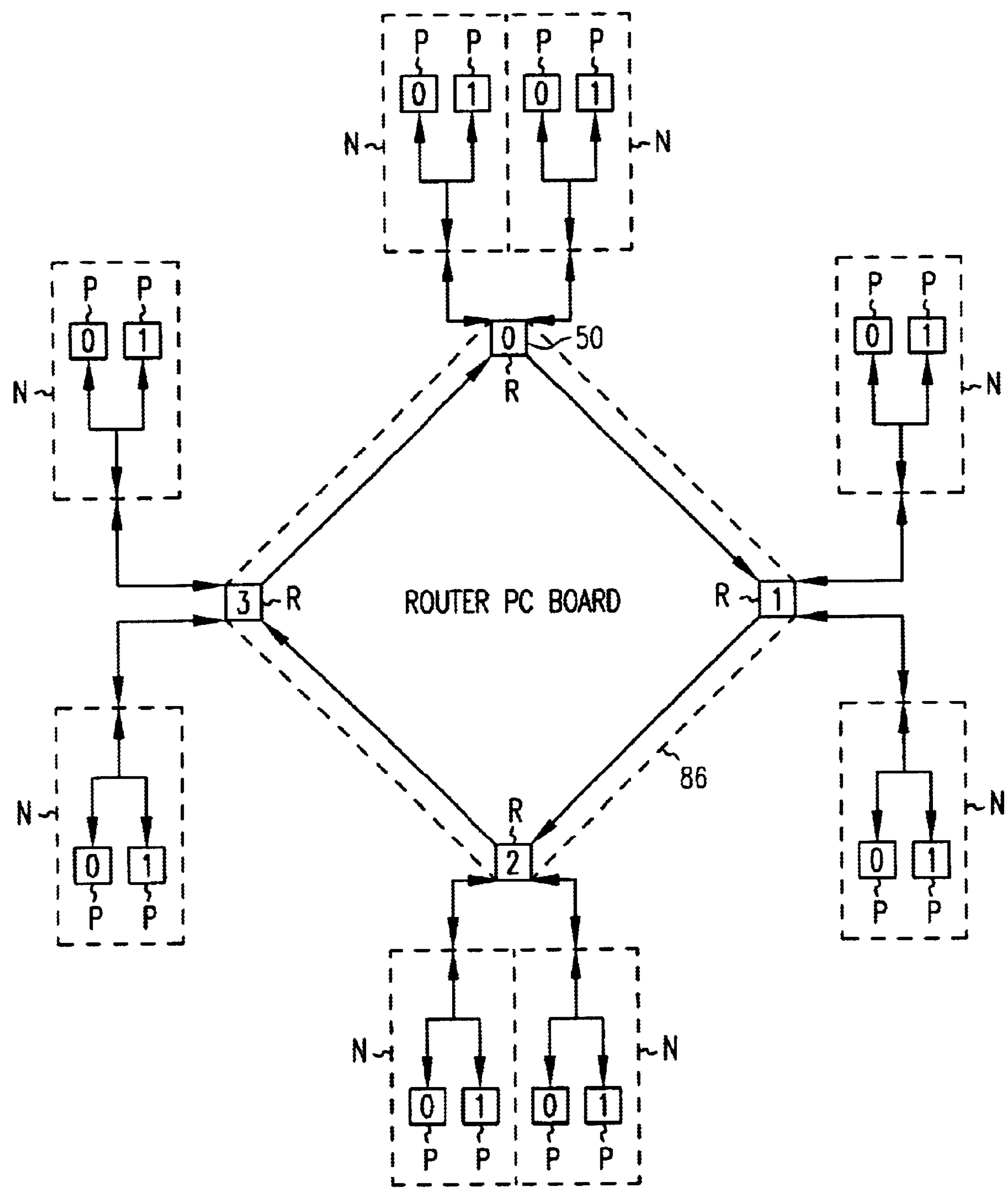
FIG. 5 illustrates a router board which could be used in the systems of FIGS. 1–3.

An example X dimension configuration for one embodiment of multiprocessor computer system 20 is illustrated in FIG. 5. In one embodiment, each router PC board 86 includes four routers, such as router 50, which are labeled R and numbered 0, 1, 2 and 3. In this configuration, the X dimension does not scale as system sizes grow. Instead, in this implementation, the X dimension connections are implied in all system topologies greater than 128 nodes. Each of the four routers 50 on router PC board 86 is coupled to two nodes which are labeled N. Each node in the embodiment illustrated in FIG. 5 comprises two processors labeled P.

In this embodiment, four routers are connected on the router PC board 86 to form a torus connection of four routers in the X-dimension. The X-dimension does not scale beyond four connections. The four remaining ports of each router chip 50 are connected between router chips to form the Y and Z dimensions for the torus topologies used in larger systems.

Figure 6:
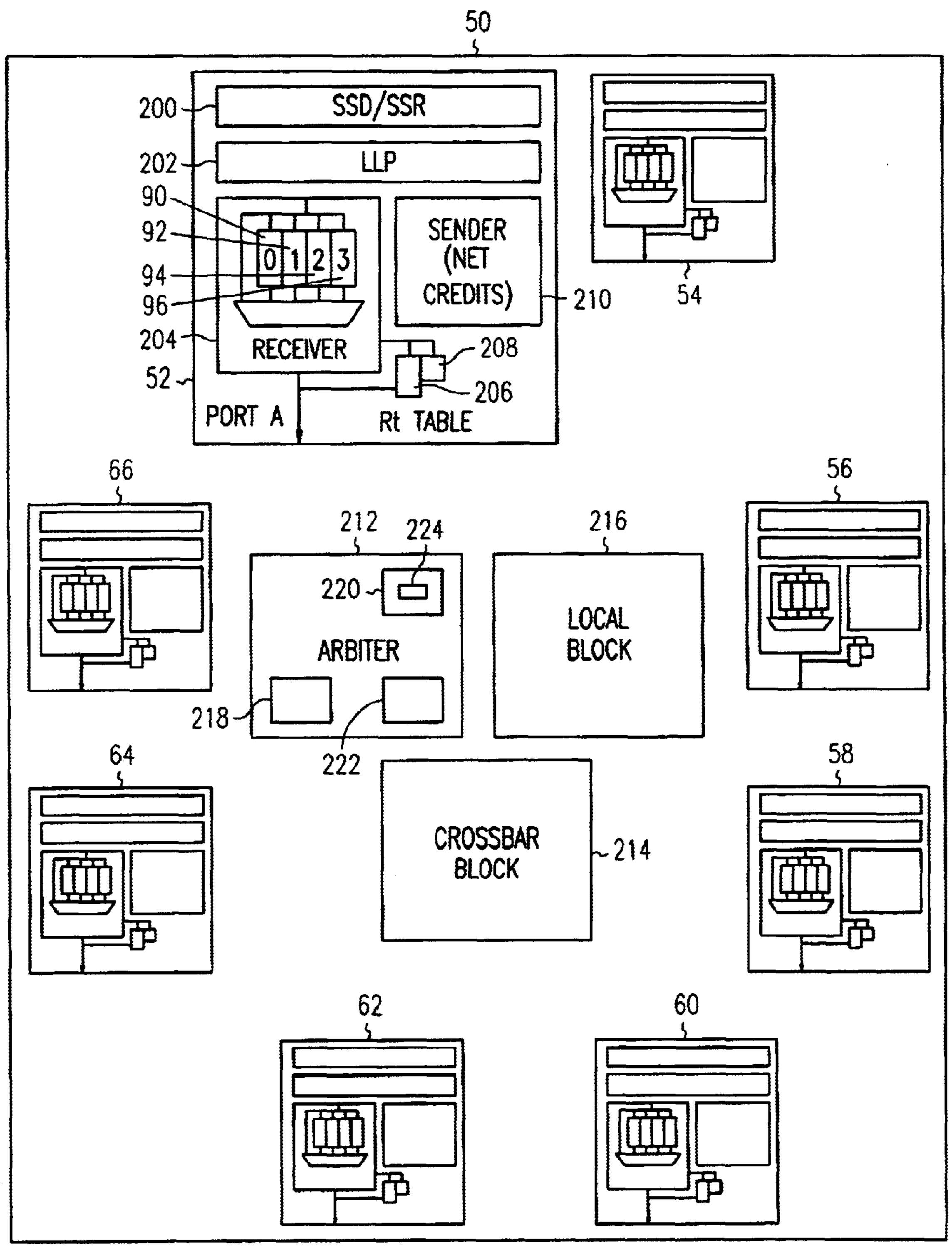
FIG. 6 illustrates a router chip which could be used in the systems of FIGS. 1–3.

One embodiment of a router chip 50 is illustrated in block diagram form in FIG. 6. Router chip 50 includes eight differential ports 52, 54, 56, 58, 60, 62, 64, and 66 for coupling to up to eight pairs of unidirectional physical links per router. In one embodiment, four virtual channels, such as indicated at 90, 92, 94, and 96 for port 52, are assigned to each physical channel. In one such embodiment, two virtual channels are assigned to requests and two virtual channels are assigned to responses. A more detailed discussion of virtual channels is provided below.

A source synchronous driver/receiver (SSD/SSR) block 200 creates and interprets high-speed, source synchronous signals used for inter-chip communication. A link level protocol (LLP) block 202 interfaces to SSD/SSR block 200 and provides transmission of data between router chips 50. A router receive block 204 accepts data from LLP block 202, manages virtual channels, and forwards data to router tables 206 and 208 and a router send block 210. Router receive block 204 includes virtual channel management logic, dynamically allocated memory queues, bypass logic, and fairness logic which ages packets when they fail to make progress. Router send block 210 drives data into LLP block 202 for transmission to other router chips.

Global router table 208 and local router table 206 together form a two level routing table which provides routing information for messages as they pass through the network. Router tables 206 and 208 are indexed by the message destination and direction, and provide a new message direction via an exit port ID. Since routing is pipelined with link arbitration, the routing tables must include instructions as to how to traverse to the next router chip.

For clarity, only port 52 is shown in detail, but all of the eight ports of router chip 50 include virtual channels 90, 92, 94, and 96, a source synchronous driver/receiver (SSD/SSR) block 200, a link level protocol (LLP) block 202, a router receive block 204, router tables 206 and 208, and a router send block 210.

In one embodiment, the arbitration unit, flow control unit and transfer unit of messages is one LLP micropacket, or 128 bits plus sideband information. Messages can be one to several micropackets in length. Router 50 does not assume any particular message length based on header information; instead, it routes a message according to header information until a tail bit is detected.

In one embodiment, router receive block 204 accepts new data from LLP 202, manages virtual channel queues and packet aging within those queues, arbitrates between local virtual channels and requests output ports to forward information. Router receive block 204

In one such embodiment, router receive block 204 issues arbitration requests to arbiter 212 and looks up new routing data in parallel. When a grant is received, receive block 204 decides which virtual channel is awarded the grant and provides that data from that virtual channel while updating the state of the queue. Once granted, message data flows directly from a receive block register, through crossbar 214 and to a sender block 210. In one embodiment, sender 210 receives message data, calculates CRC, and sends the data to the SSD 200 in the same clock cycle.

In one embodiment, data comes directly from LLP 202 and performs a router table lookup. The table result is written into a virtual channel input buffer (LPRA), and may also bypass the input buffer directly to the output multiplexer in anticipation of a bypass request. In one embodiment, data which is not bypassed is read from the input buffer, and a new age value is merged into data headers before entering crossbar 214.

The router receive block uses Dynamically Allocated Memory Queues (DAMQs) to track messages in its input. The DAMQ has superior performance characteristics than other schemes for two main reasons.

First, the DAMQ solves the 'block at head of queue' characteristic of a standard FIFO. That is, messages are not blocked by prior messages destined for different output ports. Second, the DAMQ maintains maximum buffer efficiency, as there are no restrictions on buffer allocation for arriving messages, as a solution of multiple dedicated FIFOs would have.

In one embodiment, router 50 implements its DAMQs as bit stacks, or hand placed macros containing registers and logic which make up each bit stack. All DAMQ instances are identical, and there is one DAMQ for each virtual channel of each receive port, or a total of 32 DAMQs per router.

Figure 18:
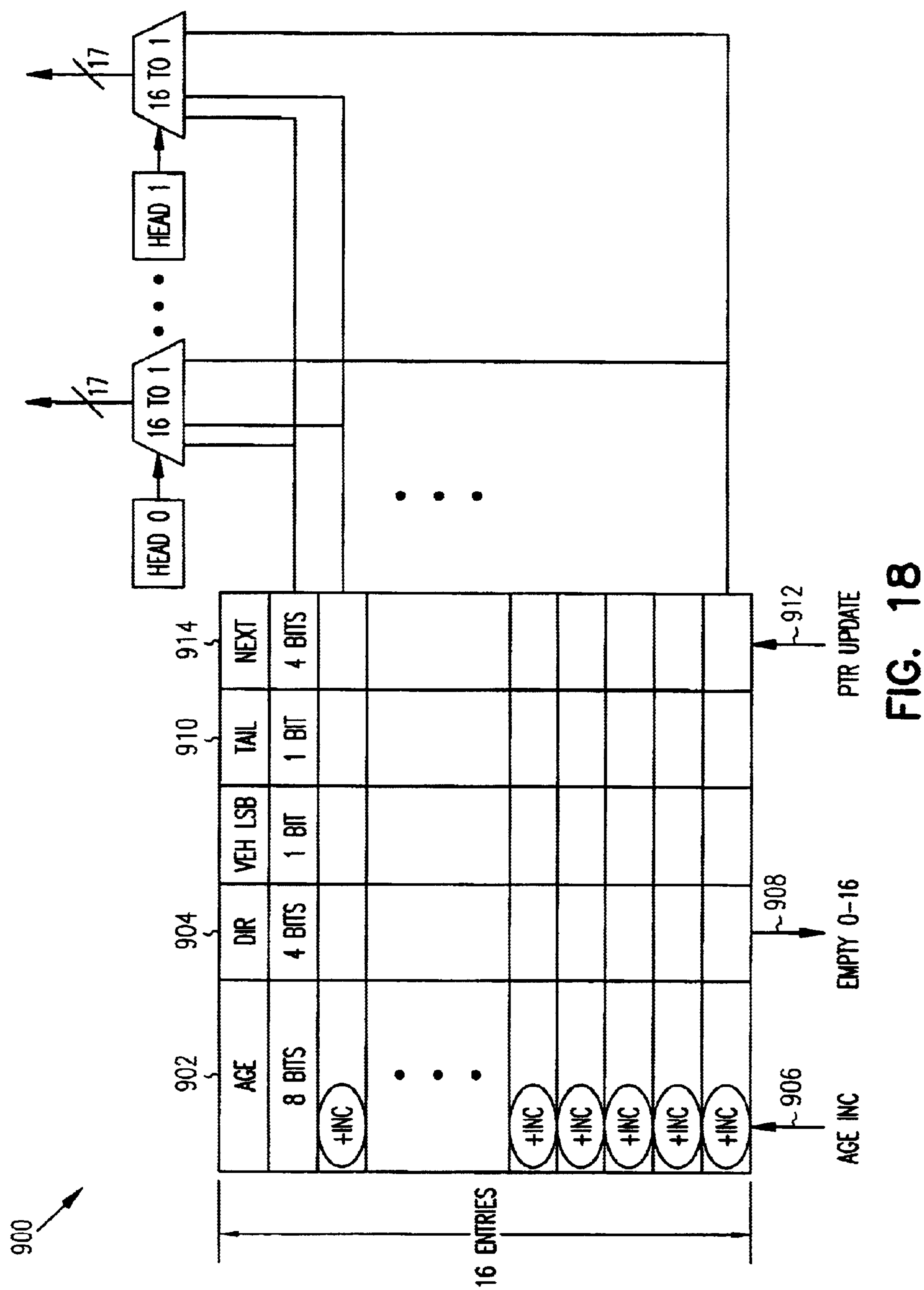
FIG. 18 illustrates an example packet queuing control structure.

In one embodiment, each DAMQ entry stores enough information about its corresponding Vch LPRA entry so that an arbitration decision can be made. An example DMAQ control structure 900 is shown in FIG. 18. In the embodiment shown in FIG. 18, an age value 902 is kept in the DAMQ so that age prioritization of arbitration is always available. In one such embodiment, DAMQ 900 increments its age values 902 each times stored each time an age increment pulse 906 is received from local block 216.

In FIG. 18, direction (Dir) field 904 indicates the target direction of each entry. In one embodiment, a value of 1111 (binary) indicates that the entry is invalid, thus creating an empty signal for that entry. If the incoming request has an invalid direction field (0×8F), the requesting micropacket and all corresponding data packets are aborted in router 50 and stopped from passing to the output ports. The illegal port bit of the port error register is set indicating an illegal direction field.

Empty signals 908 are priority encoded to produce a DAMQ free list. Tail 910 indicates the entry is a tail pointer. PtrUpdate 912 occurs when a new packet arrives which targets the same direction for an entry which is the tail position for that direction list. Next field 914 is a pointer to the next entry in the list which targets the same output port. There are also head and tail pointers to help with efficient list management.

In one embodiment, router arbiter block 212 operates with router receive block 204 to arbitrate for output ports. In one embodiment, router arbiter block 212 executes two levels of arbitration for the router chip. The first level arbiter performs a wavefront arbitration to selects a near-optimal combination of grants for a given arbitration cycle and informs receiver block 204 which requests won. Ports which are not used during the first level arbitration have a second chance to be granted by the second level or bypass arbiter. Fairness via age comparison is contained within the arbiter block.

A router crossbar block 214 includes a series of multiplexers which control data flow from receiver ports to sender ports. Once arbiter block 212 decides on the winners, arbiter block 212 forwards this information to crossbar block 214, which provides connections from receivers to senders.

In one embodiment, a router local block 216 is a control point of router chip 50. Router local block 216 provides access to all router controls and status registers including router tables 206 and 208, error registers (not shown), and protection registers (not shown). Router local block 216 also supports special vector message routing, which is used during system configuration. In one embodiment, router local block also supports hardware barrier operation. Such hardware barrier operations are described in detail in U.S. patent application Ser. No. 08/972,010 entitled "SERIALIZED, RACE-FREE VIRTUAL BARRIER NETWORK," filed on Nov. 17, 1997 by Thorson et al., the description of which is herein incorporated by reference.

Message Flow

In one embodiment, messages vary from one to several micropackets in length. Router chip 50 does not assume any particular message length based on header information, but routes a message according to header information until a tail bit is detected. The message header contains all routing and priority information required to complete the message route. Several other fields in the message header are used for memory, processor, and I/O operations. However, only a few fields are decoded by router chip 50. The remaining fields are passed along unchanged as data. Network and node operations are separated as much as possible to permit future networks or future nodes to be interchanged with minimal compatibility problems.

Message header packets follow tail micropackets. Once a micropacket is detected by router chip 50 with its tail bit set in a sideband (discussed below), the next micropacket to the same virtual channel is assumed to be a header. After reset, the first micropacket received by router chip 50 is assumed to be a header. Message body packets are treated as all data, except for sideband information.

A sideband is a field of information that accompanies each micropacket. In one embodiment, router 50 employs the sideband to tag each micropacket with a virtual channel, to communicate virtual channel credits, and to indicate error and tail conditions. Error bit encoding indicates that the micropacket accompanying the error bit indicator encountered a memory ECC error or other type of source error. It is necessary to encode the bit error for every micropacket because, for example, an error might not be detected until the end of a block read and the header of a message will already be routed through the network and cannot indicate an error state.

Message Aging

In one embodiment, each message has an age associated with it and message age influences internal arbitration in router chip 50, where priority is given to older messages. Thus, in one embodiment, a message traveling across the network ages each time it is stored in a virtual channel buffer. The longer a message waits in a virtual channel buffer, the more it ages. In another embodiment, message age increases at predetermined intervals (e.g., 100 clocks, 1000 clocks, etc.) In either case, the aging process continues until the aging limit is reached. In one embodiment, the upper age values are reserved for fixed high priority packets.

In one embodiment, each packet header includes an age field. Each age field contains an age value. When a packet is formed the age value is set to a constant (e.g., zero). As the packet is routed through network 110, the age value increases.

As was noted above, linear aging is adequate for network topologies but begins to lose effectiveness as the size of network 110 and the number of packets on network 110 increase. To counter this, in one embodiment, network 110 applies a nonlinear aging algorithm which increases the age value in a nonlinear fashion as a function of the current age.

One of several nonlinear age rates can be selected based on system size. Nonlinear age rates are used to provide a network 110 which is as fair as possible across a diverse range of traffic patterns. In one embodiment, the selected age rate is chosen to be as fast as possible without allowing the maximum age value to be reached by a significant number of packets. This last limitation is important; arbitration becomes less effective as more packets have the maximum age since a fair priority cannot be determined based on their identical age.

In one embodiment of the present invention, one can choose between a number of different aging algorithms via an Age Rate Select field in a global parameter register. Each algorithm provides a fast aging rate for "young" packets, but the rate slows as the packets get older.

In one embodiment, the age rate for any packet is determined by its current age and the algorithm selected. In one such embodiment, the current age of a packet is classified into one of four ranges. For a given age rate, each range is associated with a bit of a free running counter. When the assigned bit toggles, the age of the packet is incremented. In the table shown in FIG. 7, free running counter bits 700 for particular combinations of age-range 702 and age-rate selection 704 are shown. In the example shown, a maximum normal age of 240 is assumed, with the remaining age values reserved for high priority packets. The table shown in FIG. 7 also includes, therefore, the maximum number of clock periods 706 that a packet can age before the maximum normal age is reached.

Figure 8:
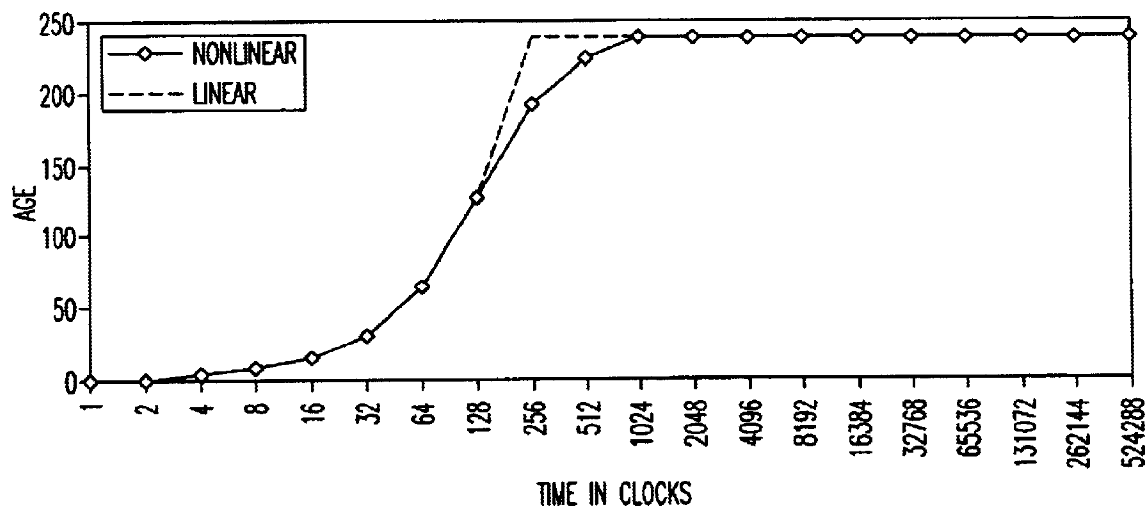
FIGS. 8–15 provide a comparison of the nonlinear aging algorithms of FIG. 7 to linear aging.
Figure 9:
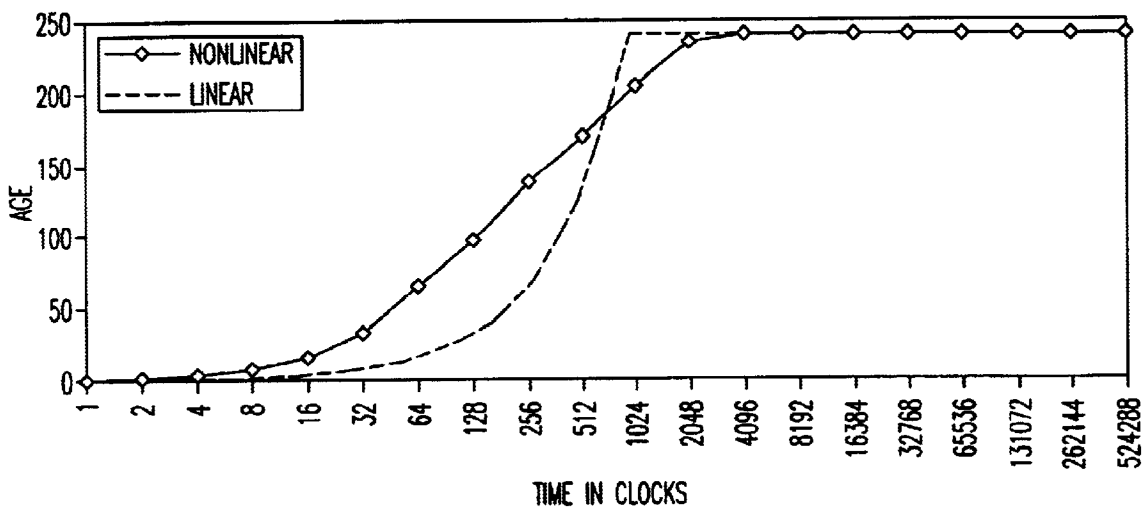
Figure 10:
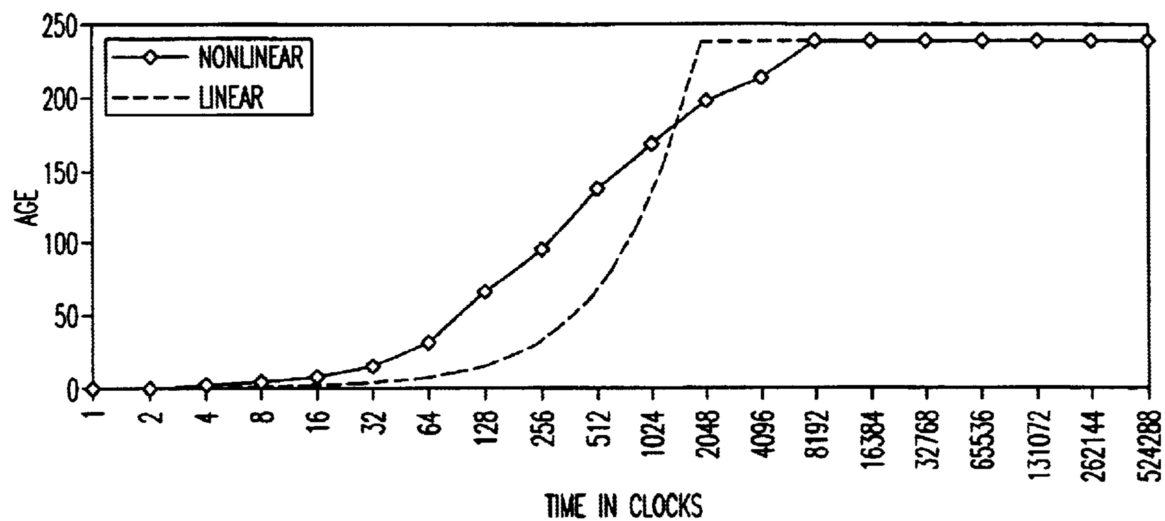
Figure 11:
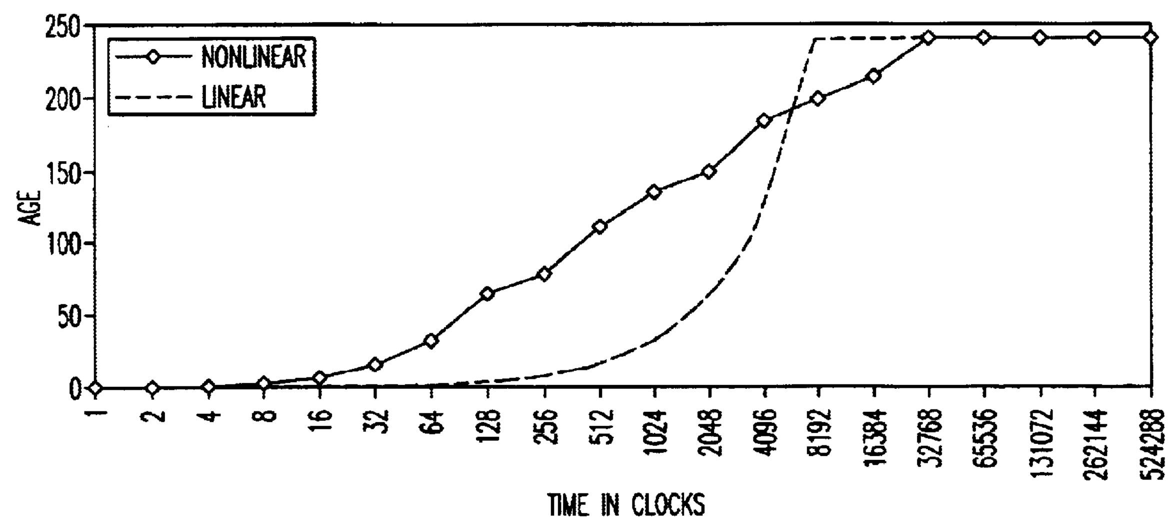
Figure 12:
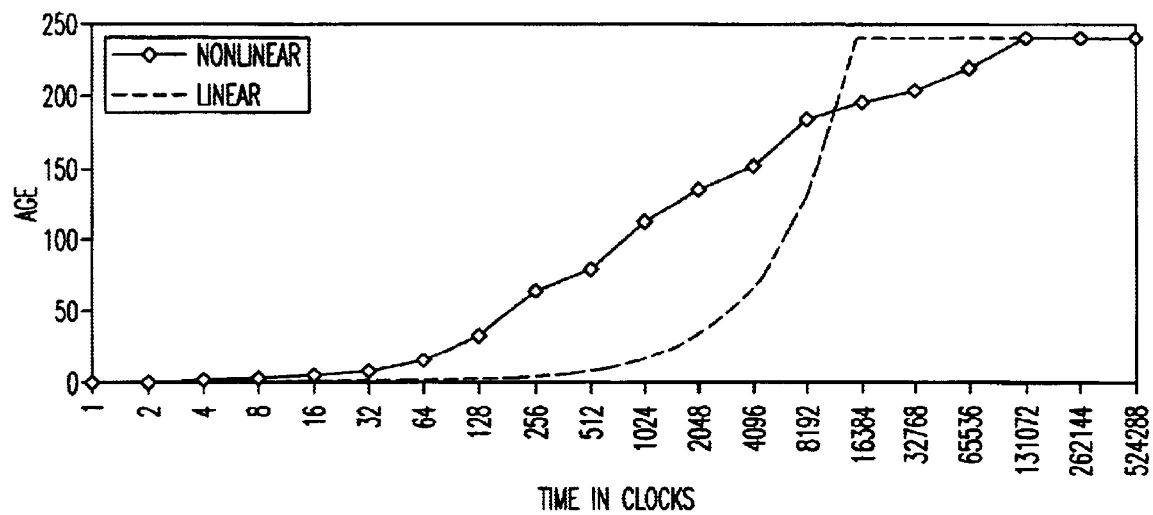
Figure 13:
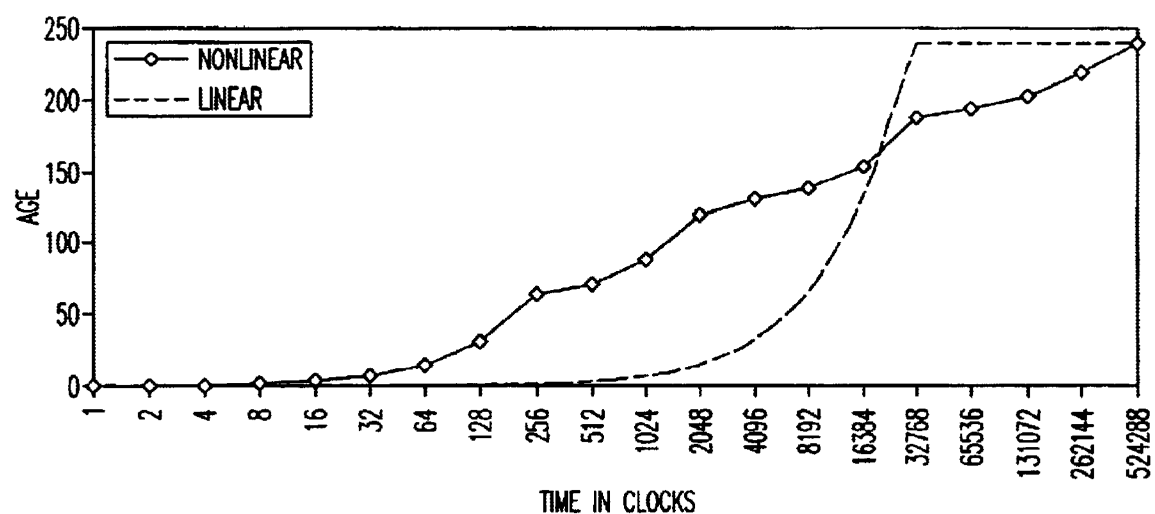
Figure 14:
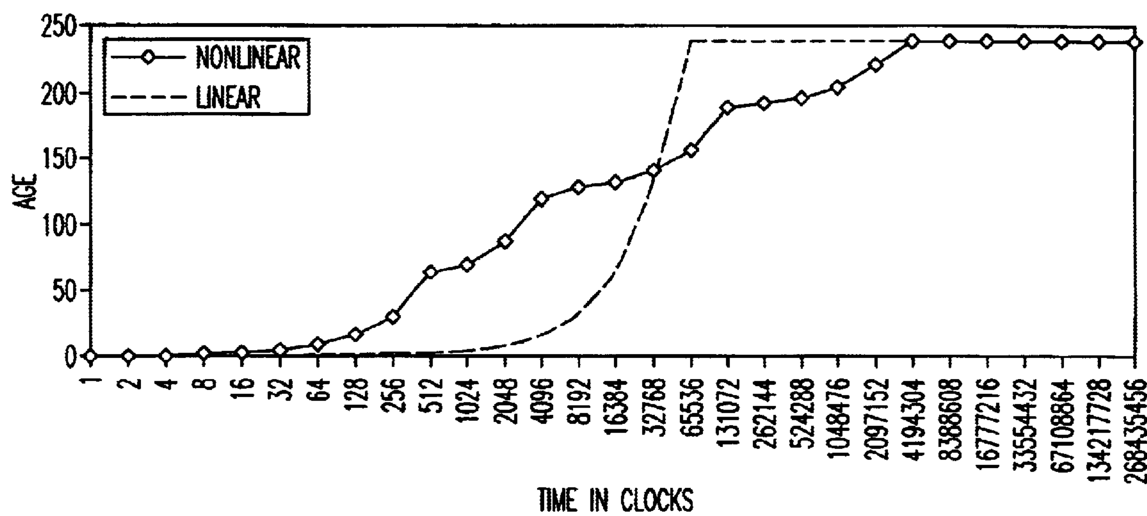
Figure 15:
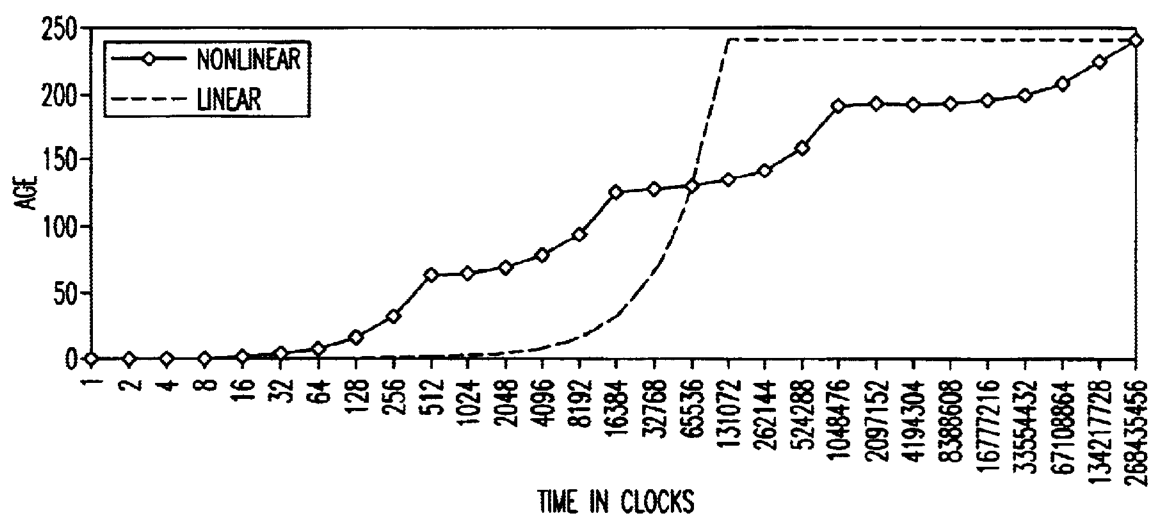

Examples of each of age-rate selections 0–7 from FIG. 7 are contrasted with linear aging in each of FIGS. 8–15, respectively. FIG. 8 uses a linear aging factor of one and nonlinear exponents 0, 0, 1 and 3 as is shown in for age-rate selection 0 in FIG. 7 to push the time at which the maximum normal age is reached from 240 to 637 clock periods. FIG. 9 compares a linear aging factor of four to the nonlinear effect of age-rate selection 1 in FIG. 7. FIG. 10 compares a linear aging factor of eight to the nonlinear effect of age-rate selection 2 in FIG. 7. FIG. 11 compares a linear aging factor of 32 to the nonlinear effect of age-rate selection 3 in FIG. 7. FIG. 12 compares a linear aging factor of 64 to the nonlinear effect of age-rate selection 4 in FIG. 7. FIG. 13 compares a linear aging factor of 128 to the nonlinear effect of age-rate selection 5 in FIG. 7. FIG. 14 compares a linear aging factor of 256 to the nonlinear effect of age-rate selection 6 in FIG. 7. Finally, FIG. 15 compares a linear aging factor of 512 to the nonlinear effect of age-rate selection 7 in FIG. 7.

In one embodiment, a register (DAMQ) stores the age value of each packet stored in the virtual channels. The age value is kept in the register so that age prioritization of arbitration is always available. The DAMQ register increments all ages when an age increment signal is received from local block 216. Current age for each packet is passed with the message header when the packet is transferred to the next step.

Arbiter 212 controls the flow of messages from receive ports to send ports, as well as configuring crossbar 214. In one embodiment, arbiter 212 includes a wavefront arbiter 218 and age fairness logic 220. Wavefront arbiter 218 works to ensure efficient traffic distribution and corresponding high data transfer rates through router 50. Wavefront arbiter 218 is implemented in sequential combinational logic to minimize the latency of each network reference. The initial wavefront selection value is determined by the highest valid age value of all valid packets. This distributes the traffic on each physical link and ensures forward progress for each network packet.

Figures 16, 17:
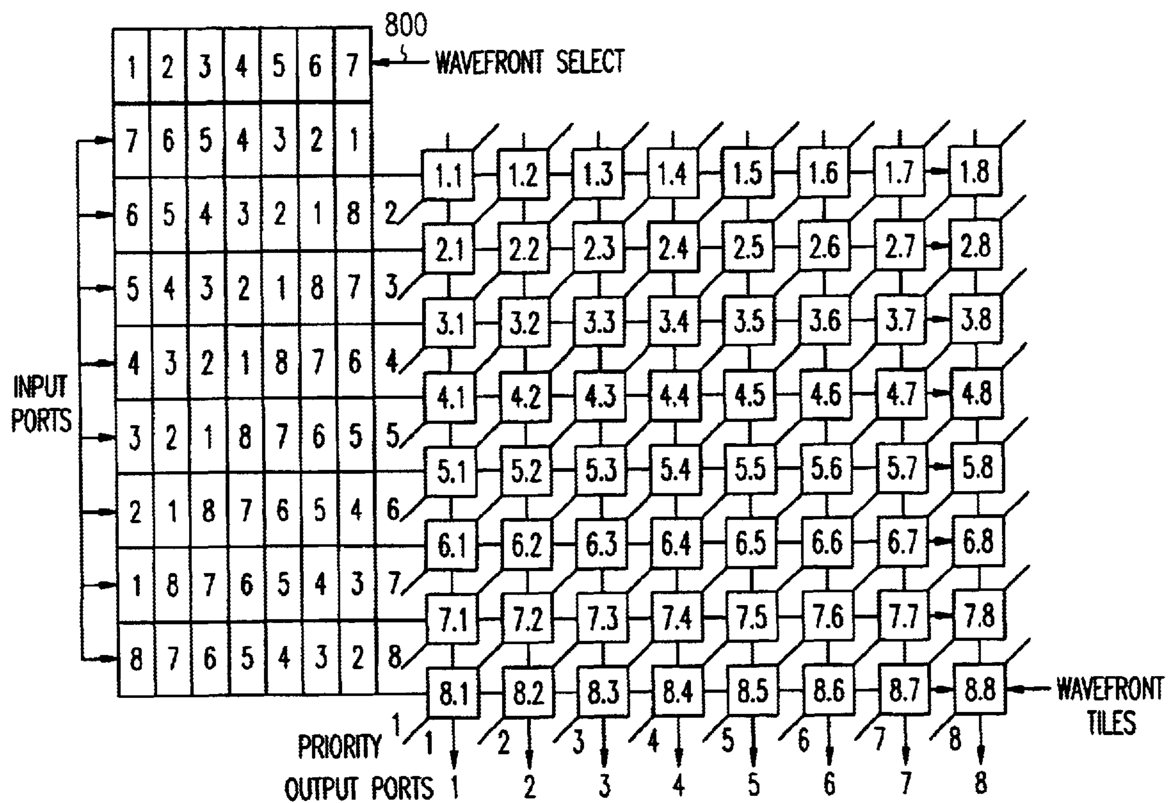
FIG. 16 illustrates a wavefront arbiter.
FIG. 17 illustrates the use of a priority counter to prevent lock out in the assignment of ports to packets having equivalent ages.

One embodiment of wavefront arbiter 218 is shown in FIG. 16. In the embodiment shown, if wavefront select 800 is set to a one, input port 8 has highest priority to output port 1 and input port 1 has highest priority to port 2. Wavefront select 800 moves from one to eight, so when priority=2, input port 8 has the highest priority to port 2. Input port 8 has the lowest priority, however, to port 1. If wavefront select 800 switches to seven, input port 8 has the highest priority to port 7.

In one embodiment, wavefront select 800 is set by the oldest requesting packet.

In one embodiment, input ports cannot output on the same port. In such an embodiment, if input port 8 has the highest priority to output port 8, the highest priority input port will be the next input port the wave points to at the next priority value.

In one embodiment, as is discussed above, each packet includes an 8 bit aging field which increments periodically as the packet transfers through network 110. Packets with the highest age value signify the oldest or highest priority packets. In one embodiment, as is discussed above, these packets are used to set wavefront select 800 for the next arbitration cycle. This guarantees that each packet will make forward progress and all livelock conditions are avoided. As a result, network traffic is more distributed across all the input ports.

An example of age-priority routing will be described next. If three channels (e.g., channels A–C) are making requests to go out the same output port (e.g., D), the channel with the oldest age value packet goes first. In this example, if port A has the highest age value, port A requests go first. In one embodiment, port A continues transmitting micropackets until a micropacket having a tail bit set completes, unless requests from port B or C go urgent.

In one embodiment, requests from port B or C go urgent when their age values reach the maximum age value (e.g., 240). If neither port B nor port C go urgent, port A continues until completion. This allows full cache lines to pass through router 50 intact. When port A requests have completed, port B and C requests compete for output channel D. If port C has the highest age value, the port C requests would go first.

A situation can arise, however, where a large number of packets are at or near the maximum age value. In such a situation, systems having a priority routing schemes such as is discussed above can become bogged down, locking out one or more of the ports.

This can be prevented by preventing the same port from winning each time that it has the same highest age value as another port. In one embodiment, as is shown in FIG. 17, age fairness logic 220 includes a priority counter 224 which advances with each grant cycle. In such an embodiment, if at priority counter 0 (the first row of the table), active packet requests on port B and port C have the same highest age value, priority goes to port B. In one such embodiment, each grant causes the priority counter to increment. The next time active packet requests are made by port B and C for the same port and with the same highest age value, priority counter value may be set to 6, and port C will be selected. (Priority 1 is the highest priority in FIG. 17.)

In one embodiment, each request packet results in a response packet being sourced by the destination node. In one such embodiment, the response packet is transmitted with its age value set to zero.

This approach can lead to problems in large topologies of network 110. In large topologies, aging of the request packets as they propagate through network 110 can result in a situation where request packets at a router continually have a higher age value than do any of the response packets. The result is a system lockout condition.

To address this problem, in one embodiment each response packet is initialized to a nonzero age value (e.g., 120 for a system having a maximum age value of 240). In another embodiment, the age value received with the request packet is stored and used as the age value of the response packet.

In one embodiment, new messages which enter router 50 bypass the virtual channels if possible. In one such embodiment, messages which use the bypass path do not age. Instead, their current age is passed along with the message header to the next step.

In one such embodiment, any new message which arrives at a router receive port when the port is empty has an opportunity to bypass. If there are no messages in progress which target the same destination port as the bypass candidate, the packet arbitrates for a bypass grant. In one embodiment, a bypass arbitration unit 222 is centrally located in router arbiter 212. If no wavefront traffic has been granted to the target port of the bypass candidate, a bypass grant is issued by arbiter 222.

In one embodiment, each output port includes a bypass arbiter 222 to minimize request latency if the output port is idle. Bypass arbiter 222 receives bypass requests from each input port and checks the output of wavefront arbiter 218 for a valid bypass condition. In one embodiment, if wavefront arbiter 118 has granted a request to the output channel or if any virtual channel requests are still in progress, all bypass requests are denied. Bypass requests can also be denied if the proceeding output packet is a squashed (canceled) output flit or if wavefront arbiter 118 has granted the requesting channel access to a different output channel. In one embodiment, bypass requests through bypass arbiter 222 save two clock period relative to requests through wavefront arbiter 218.

In one embodiment, routing from the input ports to local block 216 is based on the same type of rotating priority scheme shown in FIG. 17.

Message Routing

In one embodiment, routing chip 50 supports two types of routing which are: 1) table-driven routing for standard, high-speed routing based on internal routing tables; and 2) vector routing for initialization, based on routing instructions included in the message header. Table-driven routing messages are injected into the network with a destination address and an initial direction (i.e., exit port ID), and the routing tables contain the information necessary to deliver the message to its destination. Vector routing requires the source node to completely specify the routing vector when the message is injected into the network.

In one such embodiment, the vector routing feature of router chip 50 is used to for access to router registers and some interface circuit registers. Vector routing provides network exploration and routing table initialization and is a low performance routing. The vector routing function permits software to probe the network topology and set up routing tables and ID fields through uncached reads and writes. Once software programs a vector route in a vector route register, software may execute uncached reads and writes which initiate vector route packets.

In one embodiment, vector route messages are always two micropackets in length. The first micropacket is a standard header, with command encoding indicating read or write, and direction field indicating router core. Whenever a vector route header enters a router chip 50, the vector route header is routed directly to router local block 216. Once inside router local block 216, the second micropacket is examined for the vector route data. Vector route data consists of a vector having vector elements, which each comprise a direction pointer. Direction pointers may include either an output port ID or a vector terminator.

At each hop during the request phase of the vector route, local block 216 examines the current vector and routes according to the right-most vector element. The entire route vector is then shifted right by the number of bits in a vector element, and a return direction port ID is shifted in as the most significant bits. A vector request routed message has reached its destination when the right-most vector element contains binary some indicator, such as for example, 0000 for a four bit vector element.

Once the request packet reaches its destination (the current request vector is all zeros), a response header is formulated and the message is sent back to the port it entered on, but on the reply virtual channel. The new vector is generated such that the least significant nibble becomes the most significant nibble. As a response makes its way through the network, the right-most vector elements are used to route the message and the vector is shifted right. The message eventually reaches the originating node via the same route on which it left.

Table-Driven Routing

All message packets routed by scalable interconnection network 110 during normal operation are routed via routing tables, such as routing tables 206 and 208. Routing tables 206 and 208 are distributed across each port of each router in scalable interconnection network 110 and provide a high-speed, flexible routing strategy which can be adapted through software. Routing tables 206 and 208 determine the path taken by messages between any two nodes in the system; they must be programmed such that they do not introduce cycles in the directed routing graphs. The physical message paths of network 110 are static. The message paths are programmed into routing tables 206 and 208 by software. In the event that a fault develops in scalable interconnection network 110, in one embodiment, the static routes dictated by routing tables 206 and 208 are modified during system operation. In one such embodiment, however, such software manipulation of routing tables 206 and 208 is used only for fault avoidance, not for congestion control. Further details of table routing are in U.S. patent application Ser. No. 08/971,587, described above.

As noted above, in one embodiment, router 50 includes four virtual channels for each port. One method of assigning virtual channels is illustrated in diagram form in U.S. patent application Ser. No. 08/971,587, described above, the description of which is incorporated herein by reference. A more detailed discussion of virtual channels in an interconnect network such as interconnection network 110 is provided in "Virtual Channel Assignment in Large Torus Systems," filed Nov. 17, 1997 by Passint et al., the description of which is incorporated herein by reference.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. In a multiprocessor system having a plurality of nodes connected to a network, wherein communication between the plurality of nodes is in the form of packets, a method of aging packets, comprising:

building a packet having an age value;

transmitting the packet through the network; and increasing the age value at predetermined intervals, wherein increasing includes determining a current age of the packet and changing the interval as a function of the current age, wherein changing the interval as a function of the current age includes:

creating a plurality of age ranges;

classifying the current age into one of the plurality of age ranges; and setting the interval as a function of the age range into which the current age is classified.

2. The method of claim 1, wherein building a packet includes setting the age value to a constant.

3. The method of claim 1, wherein each interval has a duration that is a function of a bit of a free running counter.

4. A computer readable medium having program code implementing the method of claim 1.

5. A method of aging packets within an age-based arbitration system, comprising:

building a packet having an age field, wherein the age field contains an age value;

transmitting the packet through a first router, wherein transmitting includes routing the packet through a port;

determining a first predetermined interval;

adding a first value to the age value after the first predetermined interval;

transmitting the packet through a second router, wherein transmitting includes routing the packet through a port;

determining a second predetermined interval, wherein the first and second predetermined intervals are not equal; and adding a second value to the age value after the second predetermined interval.

6. The method of claim 5, wherein building a packet includes setting the age value to a constant.

7. A computer readable medium having program code implementing the method of claim 5.

8. A method of aging packets within an age-based arbitration system, comprising:

building a packet having an age field, wherein the age field contains an age value;

transmitting the packet through a first router, wherein transmitting includes routing the packet through a port;

determining a first predetermined interval;

adding a first value to the age value after the first predetermined interval;

transmitting the packet through a second router, wherein transmitting includes routing the packet through a port;

determining a second predetermined interval, wherein the first and second predetermined intervals are not equal; and adding a second value to the age value after the second predetermined interval;

wherein determining a first predetermined interval includes:

classifying the age value into a first range of said plurality of ranges;

associating the first range with a first bit of a free running counter; and beginning a new first predetermined interval each time the first bit toggles.

9. The method of claim 8, wherein determining a second predetermined interval includes:

classifying the age value into a second range of said plurality of ranges;

associating the second range with a second bit of the free running counter; and beginning a new second predetermined interval each time the second bit toggles.

10. The method of claim 8, wherein building a packet includes setting the age value to a constant.

11. A computer readable medium having program code implementing the method of claim 8.

12. A method of aging packets within an age-based arbitration system, comprising:

building a packet having an age field, wherein the age field contains an age value;

transmitting the packet through a first router, wherein transmitting includes routing the packet through a port;

determining a first predetermined interval;

adding a first value to the age value after the first predetermined interval;

transmitting the packet through a second router, wherein transmitting includes routing the packet through a port;

determining a second predetermined interval, wherein the first and second predetermined intervals are not equal; and adding a second value to the age value after the second predetermined interval;

wherein the first and second values equal one.

13. The method of claim 12, wherein building a packet includes setting the age value to a constant.

14. A computer readable medium having program code implementing the method of claim 12.

15. In a multiprocessor system having a plurality of nodes connected by a network, wherein communication between the plurality of nodes is in the form of packets routed through a router, wherein the router includes a plurality of ports, a method of routing packets through the plurality of ports, comprising:

building a plurality of packets, wherein each packet has an age value;

setting the age value within each packet to a constant;

adding a value to the age value at predetermined intervals, wherein adding a value to the aging value includes determining a current age of the packet and changing the interval as a function of the current age;

queuing packets in the router;

transmitting one of the queued packets through one of the plurality of ports, wherein transmitting includes:

examining the age value of queued packets to determine an oldest packet; and routing the oldest packet to a port.

16. The method of claim 15, wherein routing the oldest packet includes:

determining if a packet arriving from a first port and a packet arriving from a second port have equivalent ages; and if a packet arriving from a first port and a packet arriving from a second port have equivalent ages, determining the packet to be routed as a function of the port from which it arrived.

17. The method of claim 16, wherein determining the packet to be routed as a function of the port from which it arrived includes applying a rotating priority to each port.

18. A computer readable medium having program code implementing the method of claim 15.

19. In a multiprocessor system having a plurality of nodes connected by a network, wherein communication between the plurality of nodes is in the form of packets routed through a router, wherein the router includes a plurality of input ports and a plurality of output ports, a method of routing packets through the plurality of output ports, comprising:

receiving packets at each of the plurality of input ports, wherein each packet has an age value;

adding a value to the age value at predetermined intervals;

transmitting one or more of the packets to output ports, wherein transmitting includes examining the age value of packets to determine an oldest packet and routing the oldest packet through one of the plurality of output ports;

wherein routing the oldest packet includes:

determining if a packet arriving through a first input port and a packet arriving through a second input port have equivalent ages; and if a packet arriving through a first port and a packet arriving through a second port have equivalent ages, determining the packet to be routed as a function of the port through which it arrived, wherein determining the packet to be routed as a function of the port through which it arrived includes applying a rotating priority to each port.

20. A computer readable medium having program code implementing the method of claim 19.

21. In a multiprocessor system having a plurality of nodes connected by a network, wherein the plurality of nodes includes a first node and a second node, wherein each node includes a response age register and a plurality of ports connected to a network, wherein the response age register includes a response age value, wherein communication between the plurality of nodes is in the form of packets, wherein each packet has,a source node field, a destination node field and an age field and wherein each age field contains an aging value, a method of routing packets through the plurality of ports, comprising:

generating a request packet at the first node, wherein generating includes loading a first node identifier representative of the first node in the source node field; loading a second node identifier representative of the second node in the destination node field and setting the aging value to a constant;

adding a value to the aging value at predetermined intervals;

routing the request packet through a plurality of nodes to the second node, wherein routing includes resolving port conflicts through age-based arbitration;

generating a response packet, wherein generating includes loading a first node identifier representative of the first node in the destination node field; loading a second node identifier representative of the second node in the source node field and setting the aging value to the response age value stored in the second node's response age register.

22. The method of claim 21, wherein adding a value to the aging value includes determining a current age of the packet and increasing the aging value as a function of the current age.

23. The method of claim 21, wherein setting the aging value to the response value stored in the second node's response age register includes reading the aging value from the request packet and storing the aging value read from the request packet into the response age register.

24. A computer readable medium having program code implementing the method of claim 21.

* * * * *